Figure 1:
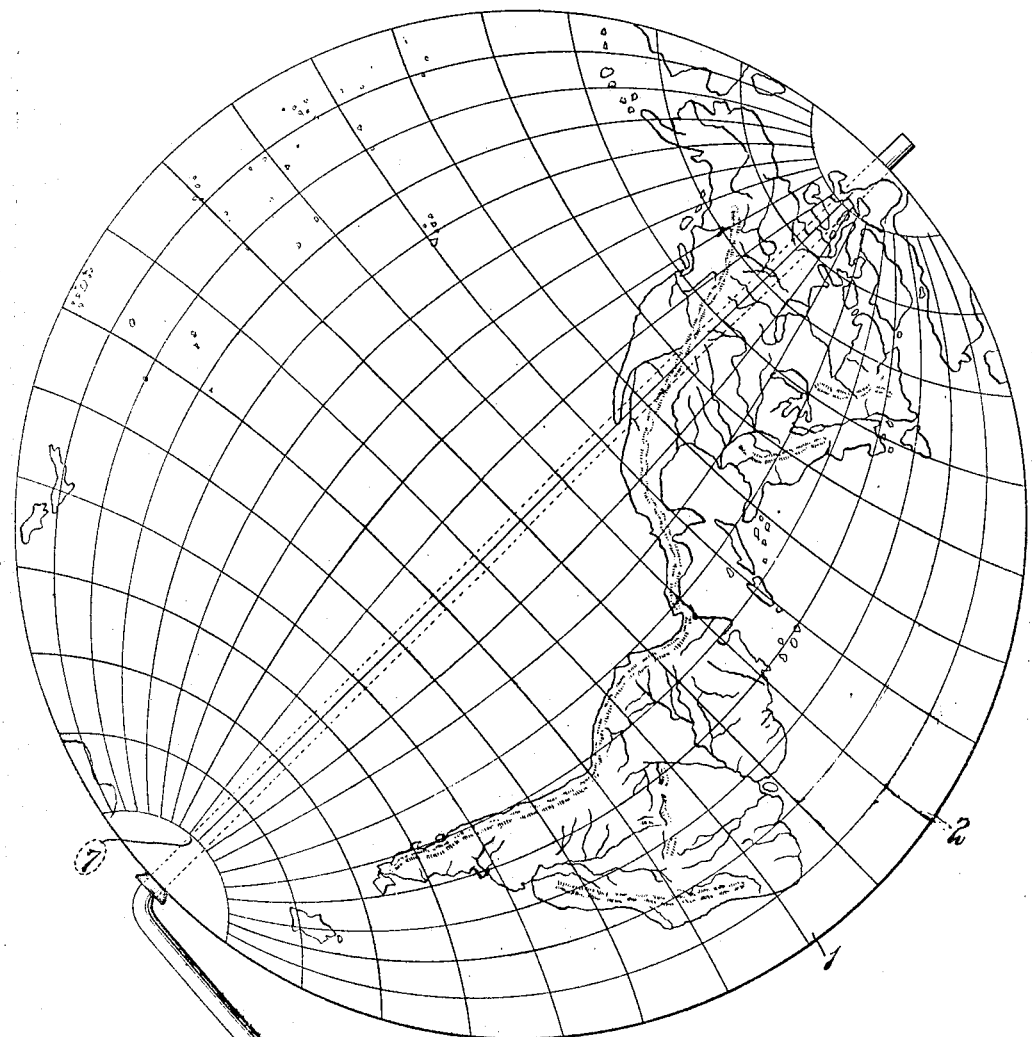

No. 892,715. PATENTED JULY 7, 1908.
J. A. DE VILBISS.
EDUCATIONAL DEVICE.
APPLICATION FILED NOV. 1, 1907.

2 SHEETS—SHEET 1.

Witnesses:
Geo. R. Jackson
Nell L. Church

Inventor:
John A. De Vilbiss.
By Bakewell Cornwall
Attys

No. 892,715. PATENTED JULY 7, 1908.
J. A. DE VILBISS.
EDUCATIONAL DEVICE.
APPLICATION FILED NOV. 1, 1907.
2 SHEETS—SHEET 2.
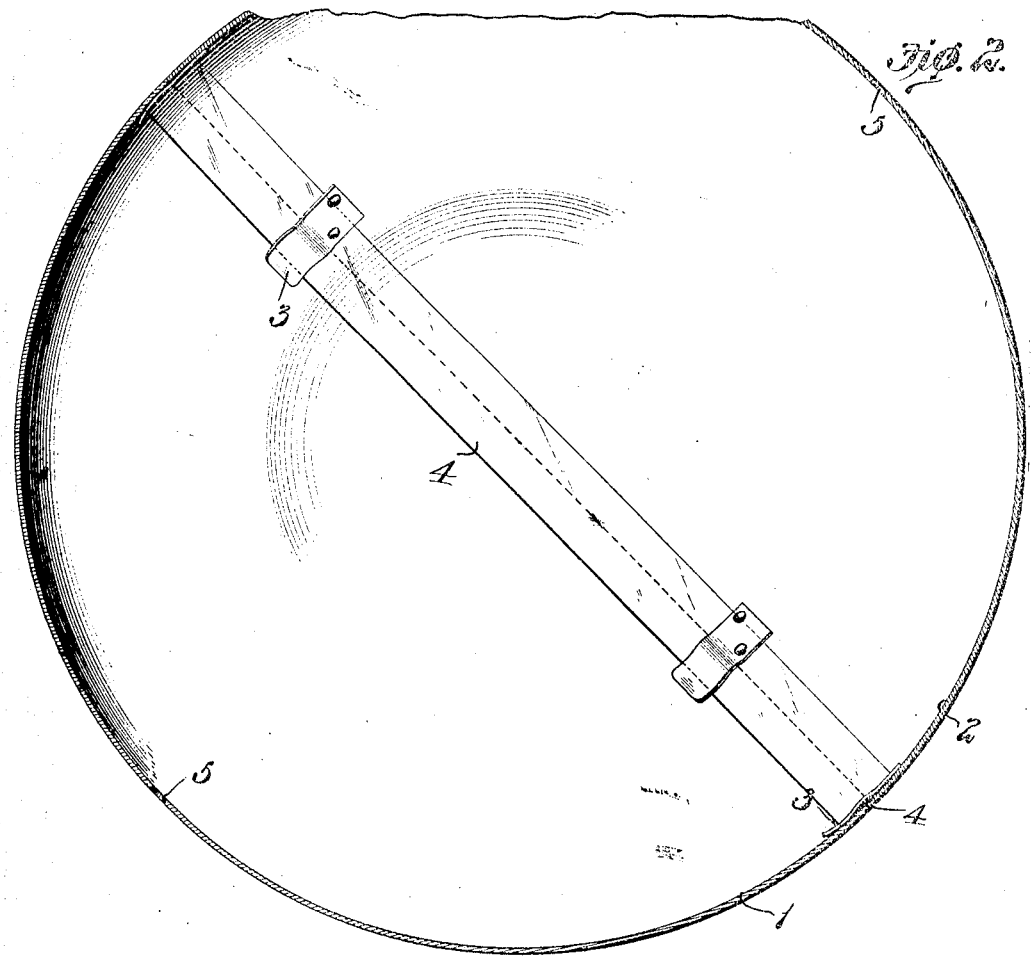
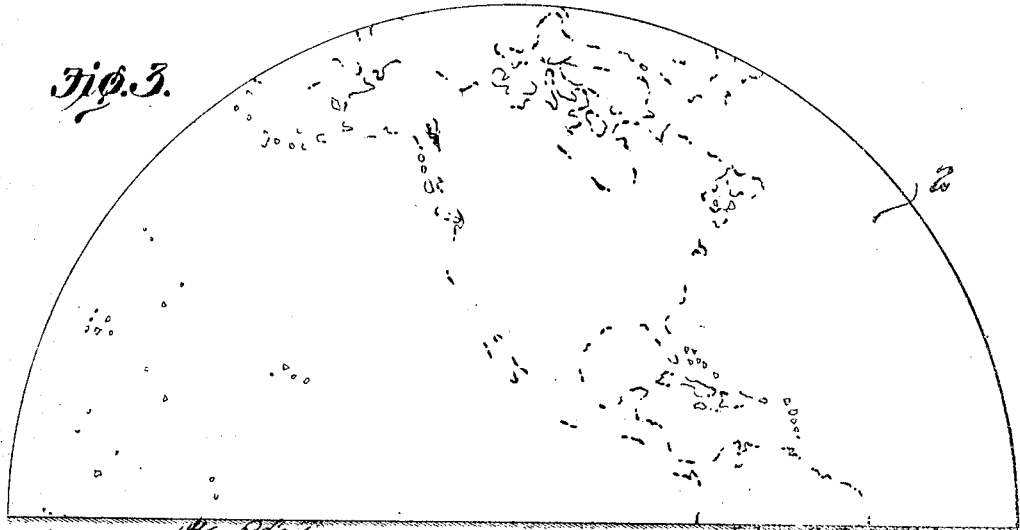

UNITED STATES PATENT OFFICE.

JOHN A. DE VILBISS, OF ST. LOUIS, MISSOURI.

EDUCATIONAL DEVICE.

No. 892,715.

Specification of Letters Patent.

Patented July 7, 1908.

Application filed November 1, 1907. Serial No. 400,203.

*To all whom it may concern:*

Be it known that I, JOHN A. DE VILBISS, a citizen of the United States, residing at St. Louis, Missouri, have invented a certain new and useful Improvement in Educational Devices, of which the following is a full, clear, and exact description, such as will enable others skilled in the art to which it appertains to make and use the same, reference being had to the accompanying drawings, forming part of this specification, in which—

Figure 1 is an elevation of a device embodying the features of my invention; Fig. 2 is a cross sectional view of the spherical-shaped member; and Fig. 3 is an elevation of one of the semi-spherical-shaped shells which forms one-half of said member.

This invention relates to educational devices, and particularly to devices that are used in instructing scholars in geography.

The main object of my invention is to provide a device that will permanently impress upon a pupil's memory the relative position of places upon the earth in a more graphic and real manner than was possible with the devices which have heretofore been used in teaching geography.

Briefly stated, my invention consists in a spherical-shaped member provided on its exterior with a partially completed map of the world consisting of the outlines of the continents, or lines or marks indicating where the outlines should be drawn, said map being adapted to be completed by a pupil who fills in the details such for example, as the colors used for the different States and countries, the symbols used to designate the cities and other features and the names of same, thereby producing a geographical "globe".

Preferably, the spherical-shaped member is composed of two semi-spherical-shaped shells so that the pupil can handle the same easily while filling in or completing the map, said shells being adapted to be connected together after the details of the map have been filled in so as to form a complete geographical globe which can be mounted on a stand or support.

Referring to the drawings which illustrate the preferred form of my invention, 1 and 2 designate two semi-spherical-shaped shells. These shells may be formed of sheet metal, cardboard, papier-mâché, or any other suitable material, and on the exterior of same, the continents of the earth are outlined, either by embossing or impressing the material from which the shells are formed, or by printing or painting the outline of the continents. I also prefer to print, emboss, or impress the parallels and meridians and the rivers and mountains of each continent so that the pupil can complete the map by filling in the boundary lines of the States and countries and coloring same and also printing the names and symbols which designate the cities, rivers, lakes, States, mountains, islands, etc. The pupil places each section of the spherical-shaped member on his desk while he is working on same so that he can handle it easier than if the sections were connected together and mounted on a stand or support. One of the shells is provided adjacent its edge with yielding clips 3 that are secured to the inside of said shell, as shown in Fig. 2, so that when the two shells are placed together, said clips will engage the inside face of the edge portion of the other shell and thus hold said shells together. It is also preferable to provide one of the shells with a strip or band 4 containing gum or mucilage so that it will adhere to the other shell and thus permanently secure said shells together. Each shell is provided with an opening 5, as shown in Fig. 2, and after the shells have been connected together, the spherical-shaped member is mounted on a stand 6 provided with a support 7 which passes through the openings 5 in said shells so that the globe can be revolved or turned about the support 7 as an axis. It is immaterial, however, so far as my broad idea is concerned, how the shells are connected together or what the globe is mounted on as my invention, broadly stated, consists in a geographical globe that is only partly formed and which is adapted to be completed by filling in the colors, names and symbols that are generally used on maps to designate the various features thereof. Instead of providing the spherical-shaped member with the complete outlines of the continents and islands, as shown in Fig. 1, said member can be provided with dots or marks indicating where the outlines of the continents and islands are to be drawn, as shown in Fig. 3. Furthermore, instead of printing or embossing the mountains and rivers, as herein shown, the points where same should appear can be indicated by marks or in any other suitable manner. In fact, the degree of completeness of the map which is formed on the spherical-shaped member before it is given to the pupil, will depend upon the extent of the pupil's knowledge of geography. For primary grades or classes it is preferable to have the globe or spherical-shaped member provided with the complete outlines of the continents, islands, mountains, rivers, etc., while for advanced classes, the globe can be merely provided with marks or other devices indicating where the outlines of the continents, mountains, etc., are to be drawn. This method of making maps impresses more forcibly upon a pupil's mind the relative location of the different places on the earth than if the map were made on a flat surface as is the usual custom. As the globe is very inexpensive to manufacture, a pupil can obtain one at a low cost and then complete it in the manner described, thus obtaining a geographical globe containing a complete map of the world.

Having thus described my invention, what I claim as new and desire to secure by Letters Patent is:

1. A globe for use as an educational device, comprising two semi-spherical shells, means on the edge of one of them to detachably engage the inside of the edge of the other, means to permanently secure said shells together, and means to revolubly support said shells when joined, said shells bearing indications on their outer surfaces to assist a pupil in drawing a map of the world thereon, and each shell having a plane edge whereby it can rest on a table while said map is being drawn.

2. An educational device consisting of a globe provided with outline indications of a map of the world and divided into sections along the line of the equator, means to detachably secure said sections together and means to permanently secure them together, each section having a plane edge whereby it can rest on a table while the map is being filled in, and then be joined permanently into a globe.

In testimony whereof I hereunto affix my signature in the presence of two witnesses, this twenty seventh day of September 1907.

JOHN A. DE VILBISS.

Witnesses:
WELLS L. CHURCH,
GEORGE BAKEWELL.